May 27, 1930. N. G. ROBERTSON 1,760,607
METHOD OF MAKING SHOVELS
Filed Feb. 6, 1928
FIG. 1.
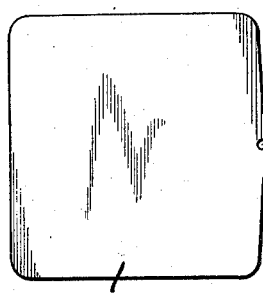
FIG. 4.
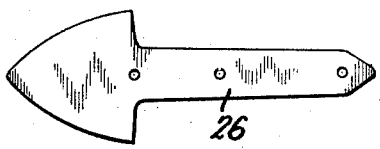
FIG. 2.
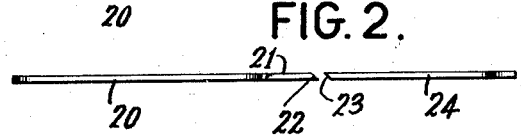
FIG. 5.
FIG. 3.
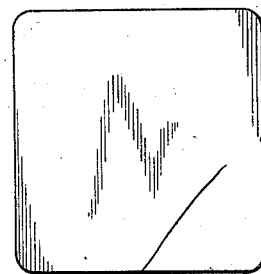
FIG. 6.
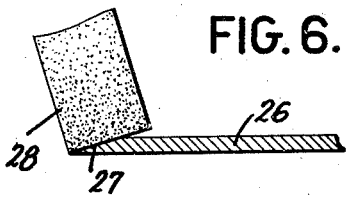
FIG. 8.
FIG. 7.
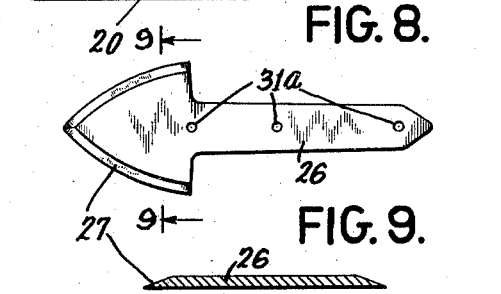
FIG. 9.
FIG. 10.
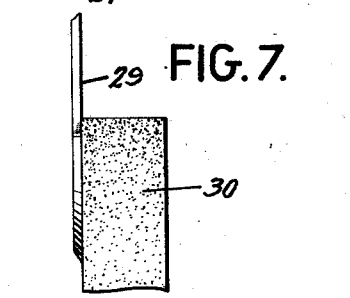
FIG. 11.
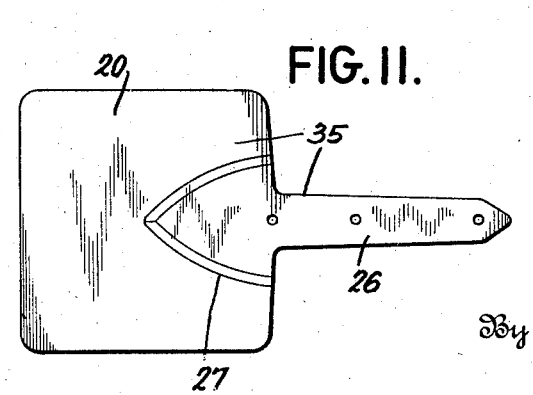
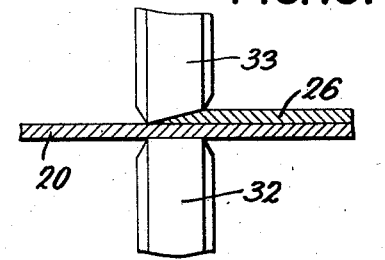
Inventor
Nathaniel G. Robertson
By his Attorneys
Cooper, Kerr & Dunham Patented May 27, 1930

1,760,607

UNITED STATES PATENT OFFICE

NATHANIEL GOULD ROBERTSON, OF WYOMING, PENNSYLVANIA

METHOD OF MAKING SHOVELS

Application filed February 6, 1928. Serial No. 252,145.

This invention relates to improvement in methods for making shovels.

The invention has for its object the provision of novel methods of making back or front strap shovels and further is directed to novel steps in the making of such shovels to the general end that a better shovel may be made at less expense than heretofore.

Further objects of the invention will be hereinafter set forth in the accompanying specification and claims and shown in the drawings, which by way of illustration shows an embodiment of the invention.

In the drawings:

Figure 1 shows the first steps upon the shovel blank.

Fig. 2 is a side elevation of the two blanks shown in Fig. 1.

Fig. 3 shows the second step in the manufacture with the back strap portion welded to the shovel blade.

Fig. 4 shows the front strap as it is initially blanked out.

Fig. 5 is a side elevational view of the front strap shown in Fig. 4.

Figs. 6 and 7 show certain grinding steps on the front strap portion of the shovel.

Fig. 8 shows the front strap after the grinding steps, and

Fig. 9 is a sectional view.

Fig. 10 shows a welding step.

Fig. 11 shows the completed article.

In more detail the various steps of making the shovel are as follows:

Blade blanks 20 with stub portions 21 thereon are provided with a bevel welding edge 22 and the back straps are also blanked out and provided with mating bevel edges 23. Thereafter the back strap portion 24 is united to the blank 20 by welding. This practice has been heretofore employed in making shovels of this class.

The subsequent steps comprise the blanking out of the front strap 26, as shown in Figs. 4 and 5. This front strap is stamped out from sheet metal in a well known manner. Heretofore drop forging operations or pressing operations and in some cases electric welding operations have been employed for uniting the front strap 26 to the blank or blade portion 10. In such steps as heretofore practiced the front strap was united to the blade and after the article was finished the blade and front strap required a considerable number of finishing operations to form the complete article.

According to the present invention the previous steps are modified in the following manner. After the front strap is blanked out the edge of the V-part of the front strap is bevelled off as indicated at 27 preferably by means of a grinding wheel 28. Subsequently the back surface 29 of the front strap is pressed against a rotating wheel 30 to remove any fins therefrom and to provide a clean surface free from scale which is suitable for the subsequent welding step.

Figs. 8 and 9 show the completed front strap after the carrying out of the operations shown in Figs. 6 and 7. The parts are now ready for the final welding step, but prior to such step the front surface or more exactly a localized area of the front surface of the blade 20, may be cleaned off in any desired manner as by a sand blast directed against it. Prior to the final welding step temporary retaining bolts are passed through the mating apertures 31 and 31ª in the front and back strap and blade portions. The assemblage of parts is then placed in the welding machine as indicated in Fig. 10. In this welding machine a cylindrical roll 32 is provided to make contact with the back of the blade part and there is also provided a bevelled roll 33 which makes contact with the bevelled edge 27 of the front strap. Welding current is then passed through to the rolls and the shovel parts are passed around between the rolls to contact all portions of the bevel 27 with the bevelled welding roll.

By the provision of the pre-bevelled surface 27 a good line contact is secured for cooperation with the bevelled welding roll and furthermore the necessity of finishing operations after welding such as were heretofore necessary are wholly obviated.

Fig. 11 shows the completed article 35 with the front strap welded to the blade and with the bevelled edge 27 of the front strap having its thin edge substantially flush with the top of the blade and welded thereto so that no subsequent finishing operations are necessary.

What I claim is:

1. In the art of making shovels wherein a blade portion and strap portion are provided which are subsequently united, including the steps of making and uniting the parts which comprise first providing a bevel around the edge of the V portion of the strap and in providing such bevel performing all surface finishing operations upon the bevel of the strap before the strap is united to the blade and in thereafter contacting the non-bevelled surface of the strap with the blade and in thereafter effecting welding of the parts together by contacting the blade part with a cylindrical welding roll and contacting the bevelled edge of the V of the strap part with a bevelled welding roll and in then rolling both parts through the rolls while current is passed therethrough to provide a continuous weld between the parts whereby a completed assembly is secured which requires no further strap finishing operations.

2. In the art of making shovels, wherein a blade portion and a strap portion having a V portion are first provided, the steps of forming and joining said parts which comprise first providing a bevel around the edge of the V portion of the strap by grinding and by this grinding operation performing all surface finishing operations upon the bevel of the strap before the strap is united to the blade, and in subsequently welding the parts together by rolling them between a cylindrical and a bevelled welding roll while passing welding current through said rolls whereby a completed assembly is provided which requires no further finishing operations upon said strap part.

3. In the art of making shovels wherein a blade portion and a strap portion are first provided, the steps of forming and joining the parts which comprise first providing a bevel completely around the edge of the V portion of the strap by grinding down the material to a thin edge and by such grinding operation performing all surface finishing operations upon the bevel of the strap before the strap is united to the blade, then removing fins and scale from the back of said strap, cleaning a localized area upon one side of the blade, then applying the back of the strap thereto and uniting the strap and blade by passing said parts between current supplying welding rolls while line contact is maintained with both the bevelled portion of the strap and the blade whereby a united assembly with a continuous weld is produced which requires no further strap finishing operations.

In testimony whereof I hereto affix my signature.

NATHANIEL GOULD ROBERTSON.